United States Patent [19]
Gustafson et al.

[11] Patent Number: 5,873,424
[45] Date of Patent: Feb. 23, 1999

[54] APPARATUS FOR PROTECTING A TRACK ASSEMBLY OF A TRACTOR

[75] Inventors: Alan D. Gustafson, Leland; Robert D. Toms, DeKalb, both of Ill.

[73] Assignee: Caterpillar Inc., Peoria, Ill.

[21] Appl. No.: 763,648

[22] Filed: Dec. 11, 1996

[51] Int. Cl.⁶ .................................................. B62D 55/088
[52] U.S. Cl. ........................................... 180/9.1; 305/107
[58] Field of Search ..................... 180/9.1, 9.42, 180/9.5, 9.54; 305/100, 107, 109, 110

[56] References Cited

U.S. PATENT DOCUMENTS

| | | | |
|---|---|---|---|
| 1,158,114 | 10/1915 | Best | 180/9.42 |
| 1,217,729 | 2/1917 | Ermatinger | 305/107 |
| 1,741,878 | 12/1929 | Rasmussen | 305/109 |
| 1,992,702 | 2/1935 | Koop | 305/9 |
| 2,780,500 | 2/1957 | Lawson | 305/9 |
| 2,900,210 | 8/1959 | Parsons | 305/2 |
| 2,982,584 | 5/1961 | Uemura | 305/107 |
| 3,394,969 | 7/1968 | Hudis | 305/109 |
| 3,861,762 | 1/1975 | Freedy et al. | 305/100 |
| 4,763,961 | 8/1988 | Parrott | 180/9.1 |

*Primary Examiner*—Kevin Hurley
*Attorney, Agent, or Firm*—Maginot, Addison & Moore

[57] ABSTRACT

An apparatus for protecting a track assembly of a tractor includes a first protection member positioned adjacent to the track assembly, the first protection member being movable between a first position and a second position. The apparatus also includes a biasing assembly for biasing the first protection member into the first position.

18 Claims, 6 Drawing Sheets

APPARATUS FOR PROTECTING A TRACK ASSEMBLY OF A TRACTOR

TECHNICAL FIELD

The present invention relates generally to a track assembly, and more particularly to an apparatus for protecting a track assembly of a tractor.

Many agricultural crops are planted in a field to form crop rows. These types of crops typically require some form of weed control in order to optimize their yield. Cultivation is one method utilized to destroy weeds and loosen soil in the field in which the crop is growing.

A cultivator is one agricultural implement used to cultivate a crop field. In general, a cultivator includes a number of teeth or hoes for engaging the soil. The teeth or hoes break up the surface of the soil and uproot unwanted weeds as a tractor pulls the cultivator across the crop field. The teeth or hoes of the cultivator are positioned such that they only engage the soil between crop rows, and thus do not disturb the crops.

A track-laying tractor can be used to pull the cultivator across the crop field. Track-laying tractors (hereinafter referred to as a "tractor") can have track assemblies that include a rubber track which forms a loop around a drive wheel, a number of mid-rollers and an idler wheel. During use of the tractor, the drive wheel rotates and engages the rubber track thereby causing the rubber track to rotate around a path defined by the drive wheel and the idler wheel. The rotation of the rubber track causes it to engage the ground, thereby propelling the tractor and the coupled cultivator over the ground to cultivate the crop field.

The above described arrangement results in the track assemblies having a number of "pinch points" between the drive wheel and the rubber track, and also between the mid-rollers and the rubber track. These pinch points cause various problems. For example, as the tractor moves between crop rows during cultivation, plant matter, such as leaves, or other material in the vicinity of the track assembly becomes trapped in the pinch points. As a result, the trapped leaves are torn away from the agricultural plants, which causes damage to the crop. Another problem with these pinch points is that the matter torn away from the agricultural plants becomes lodged between the rubber track and the drive wheel, and between the rubber track and the mid-rollers. As the tractor continues to move between crop rows the lodged plant matter builds up and causes damage to the rubber track and other undercarriage components. Therefore, the tractor must be stopped and the lodged plant matter must be manually removed from the track assembly. Manually removing lodged plant matter from the track assembly adds to the maintenance cost of the tractor.

It would therefore be desirable to provide an apparatus for protecting a track assembly of a tractor that substantially prevents material from being trapped in pinch points of the track assembly. It would also be desirable to provide an apparatus for protecting a track assembly of a tractor that substantially prevents material from being lodged between the rubber track and the drive wheel, and between the rubber track and the mid-rollers of the track assembly. It would also be desirable to provide an apparatus for protecting a track assembly of a tractor that substantially prevents the track assembly from damaging plants in the vicinity thereof. It would further be desirable to provide an apparatus for protecting a track assembly of a tractor that reduces the maintenance cost of the tractor.

DISCLOSURE OF THE INVENTION

In accordance with one embodiment of the present invention there is provided an apparatus for protecting a track assembly of a tractor. The apparatus includes a first protection member positioned adjacent to the track assembly, the first protection member being movable between a first position and a second position. The apparatus also includes a biasing assembly for biasing the first protection member into the first position.

In accordance with another embodiment of the present invention there is provided an apparatus for protecting a track assembly of a tractor. The apparatus includes a first shield assembly positioned adjacent to the track assembly, wherein (1) the first shield assembly includes a first protection member which is movable between a first position and a second position. The apparatus also includes a first biasing assembly for biasing the first protection member into the first position. The apparatus further includes a second shield assembly positioned adjacent to the track assembly, the second shield assembly includes a second protection member which is movable between a third position and a fourth position. The apparatus further includes a second biasing assembly for biasing the second protection member into the fourth position.

In accordance with yet another embodiment of the present invention there is provided a tractor which includes a track assembly and a first protection member positioned adjacent to the track assembly, the first protection member being movable between a first position and a second position. The tractor also includes a biasing assembly for biasing the first protection member into the first position.

It is therefore an object of this invention to provide a new and useful apparatus for protecting a track assembly of a tractor.

It is a another object of this invention to provide an improved apparatus for protecting a track assembly of a tractor.

It is a further object of this invention to provide a new and useful tractor.

It is yet another object of this invention to provide an improved tractor.

It is still another object of this invention to provide an apparatus for protecting a track assembly of a tractor that substantially prevents material from being trapped in pinch points of the track assembly.

It is yet another object of this invention to provide an apparatus for protecting a track assembly of a tractor that substantially prevents material from being lodged between the rubber track and the drive wheel, and between the rubber track and the mid-rollers of the track assembly.

It is still another object of this invention to provide an apparatus for protecting a track assembly of a tractor that substantially prevents the track assembly from damaging plants in the vicinity thereof.

It is yet another object of this invention to provide an apparatus for protecting a track assembly of a tractor that reduces the maintenance cost of the tractor.

The above and other objects, features, and advantages of the present invention will become apparent from the following description and the attached drawings.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
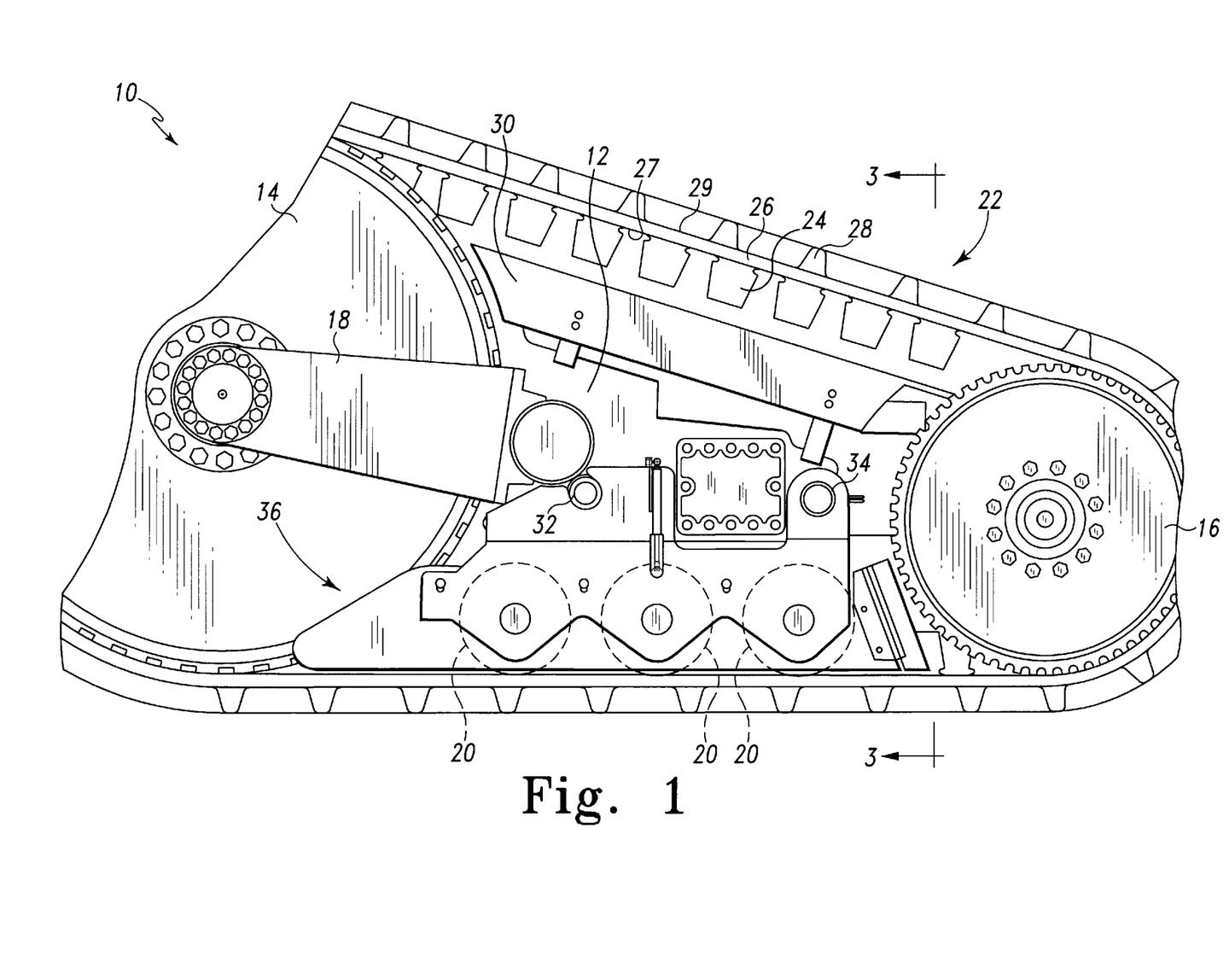
FIG. 1 is a fragmentary side elevational view of a track assembly which incorporates the features of the present invention therein, with the mid-rollers shown in phantom.

Referring to FIG. 1, there is shown a track assembly 10 of a tractor (not shown) which incorporates the features of the present invention. Track assembly 10 includes a frame 12, a drive wheel 14, an idler wheel 16 and a number of mid-rollers 20 (shown in phantom). Track assembly 10 also includes a rubber track 22, a guard 30, a first cross tube 32, a second cross tube 34, a reaction arm 18 and a first shield assembly 36.

Figure 3:
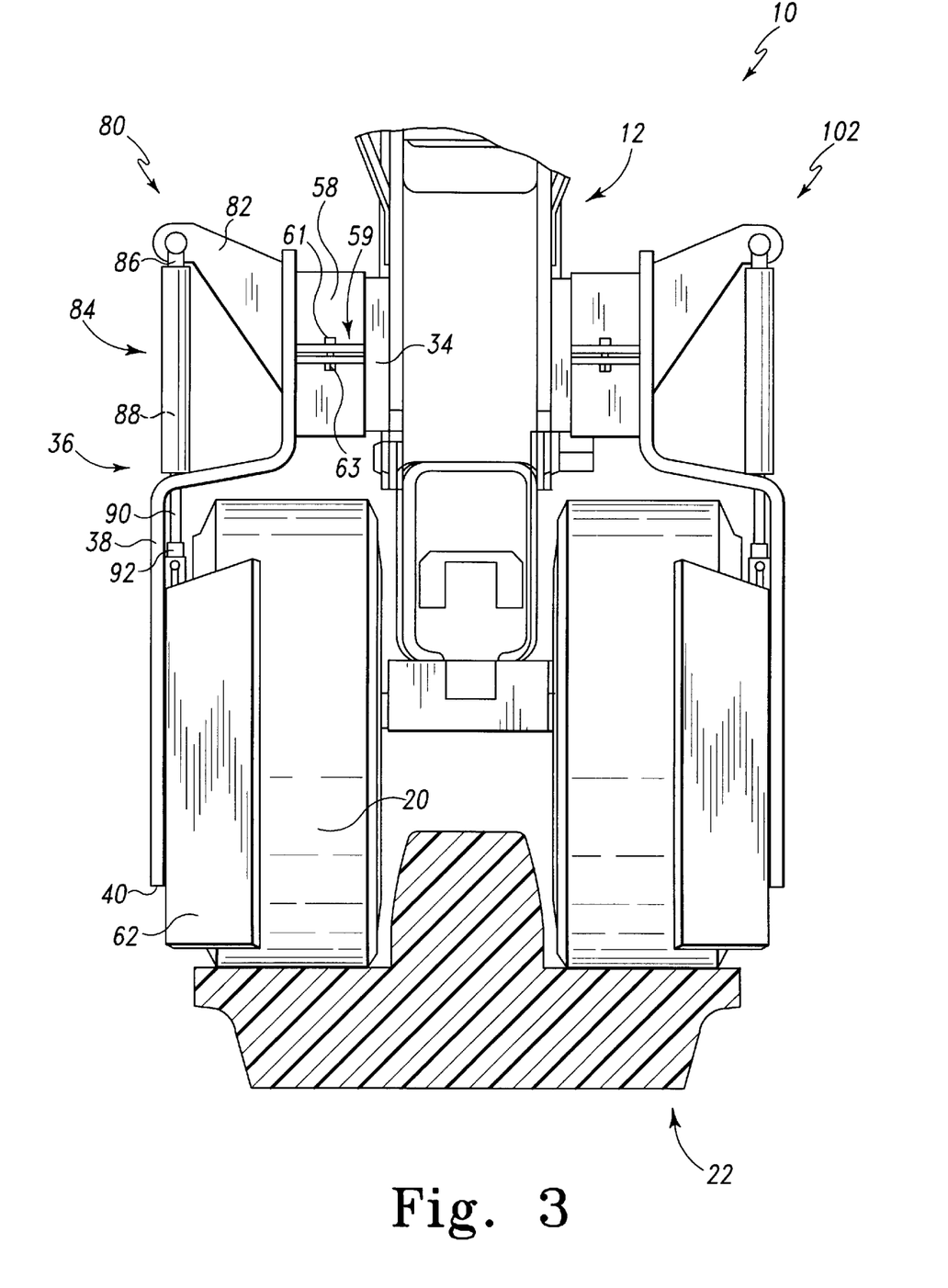
FIG. 3 is a fragmentary elevational view of the track assembly taken along line 3—3 of FIG. 1 as viewed in the direction of the arrows, with the idler wheel removed for clarity of description.

Drive wheel 14, idler wheel 16 and mid-rollers 20 are rotatably secured to frame 12. Guard 30 is fixed to frame 12 such that it is interposed between drive wheel 14 and idler wheel 16. First cross tube 32 and second cross tube 34 are fixed to frame 12 such that they are interposed between drive wheel 14 and idler wheel 16. As shown in FIG. 3, second cross tube 34 extends through a bore (not shown) defined in frame 12. Second cross tube 34 is positioned in the bore, and welded to frame 12, such that a portion of second cross tube 34 extends away from each side of frame 12. It should be understood that first cross tube 32 is fixed to frame 12 in the same manner as described above with respect to the second cross tube 34.

Referring back to FIG. 1, rubber track 22 includes a carcass 26 having an inner surface 27 and an outer surface 29. Inner surface 27 has a number of guide blocks 24 extending therefrom. Outer surface 29 has a number of lugs 28 extending therefrom. Rubber track 22 forms a loop around drive wheel 14, idler wheel 16 and mid-rollers 20. During use of the tractor, drive wheel 14 rotates and engages rubber track 22 thereby causing rubber track 22 to rotate around a path defined by drive wheel 14 and idler wheel 16. Rotation of rubber track 22 causes it to engage the ground thereby propelling the tractor over the ground to perform various work functions.

Figure 2:
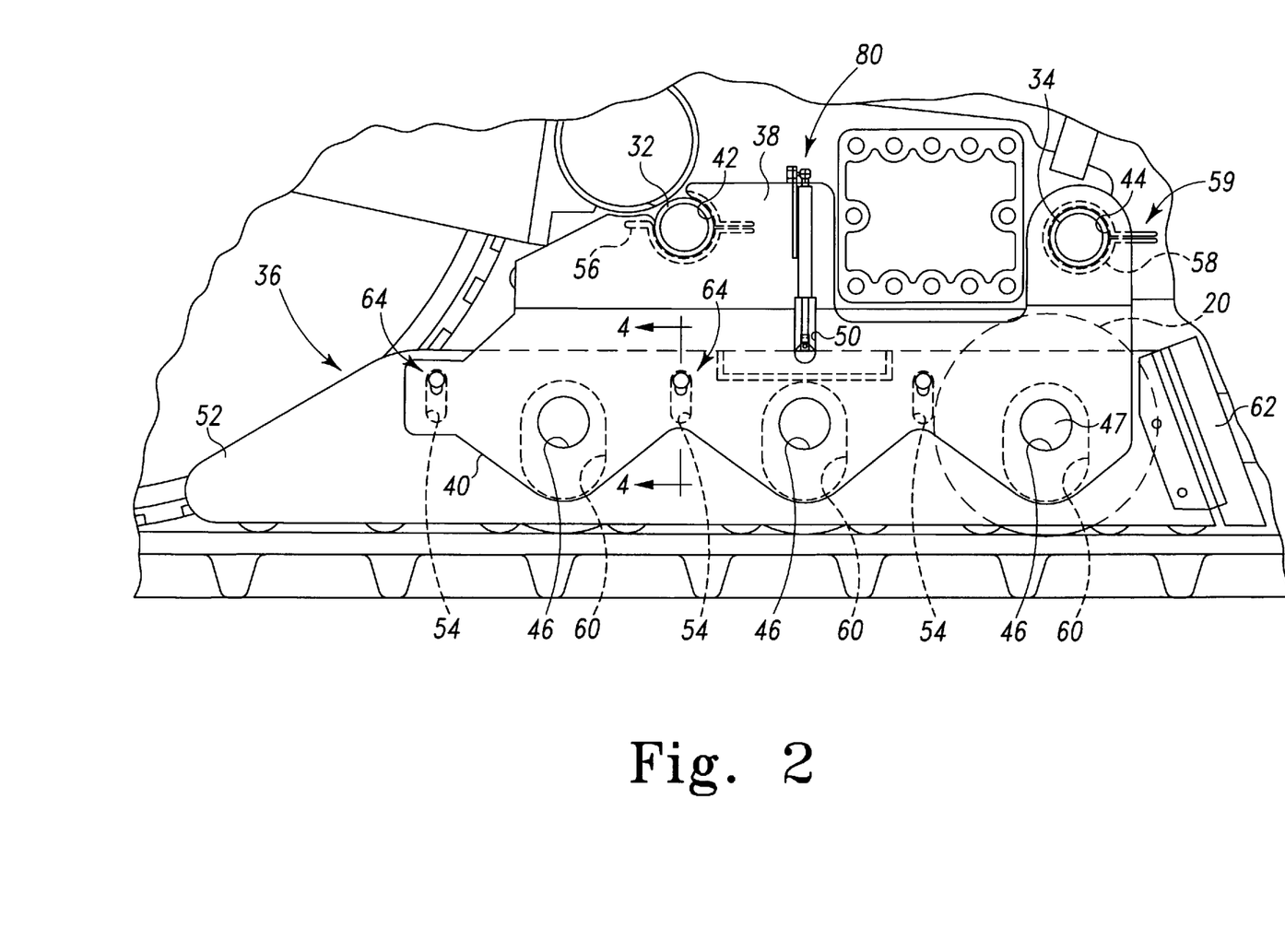
FIG. 2 is an enlarged side elevational view of the first shield assembly shown in FIG. 1, with one mid-roller, the first clasp, the second clasp, the slots, the plate holes, a portion of the first protection member, the force distribution member and the receptacle shown in phantom.

Referring now to FIG. 2, first shield assembly 36 includes a first protection member 52 and a second protection member 38. First shield assembly 36 also includes a first clasp 56, a second clasp 58, a number of movement limiting mechanisms 64, a deflector 62 and a first biasing assembly 80.

Second protection member 38 has an uneven edge 40 and a number of passageways 46 defined therein. Second protection member 38 also has a first aperture 42, a second aperture 44 and an opening 50 defined therein. Second protection member 38 is positioned relative to frame 12 such that first cross tube 32 is located within first aperture 42. Second protection member 38 is also positioned relative to frame 12 such that second cross tube 34 is located within second aperture 44.

Referring back to FIG. 3, second clasp 58 is disposed around second cross tube 34, and interposed between second protection member 38 and frame 12. A portion of an edge (not shown) of second clasp 58 is welded to second protection member 38. Second clasp 58 has a pair of flanges 59 extending therefrom such that there is a space defined between flanges 59. Additionally, each flange 59 has a bolt opening (not shown) defined therethrough.

A bolt 61 is inserted through each bolt opening of flanges 59. A nut 63 is then screwed onto one end of bolt 61 such that nut 63 engages a flange 59. Nut 63 is further screwed onto bolt 61 until flanges 59 come into contact. Note that in FIG. 3, flanges 59 are shown spaced apart. Bringing flanges 59 into contact causes second clasp 58 to clamp onto second cross tube 34, thereby securing second protection member 38 onto second cross tube 34. Securing second protection member 38 in the above described manner positions uneven edge 40 adjacent to mid-rollers 20. It should be understood that first clasp 56 secures second protection member 38 to first cross tube 32 in the same manner as described above in reference to second clasp 58 and second cross tube 34.

As shown in FIG. 2, first protection member 52 has a number of slots 54 and a number of plate holes 60 defined therein. As shown in more detail in FIG. 5, first protection member 52 also has a receptacle 96 defined in a top edge 97 thereof. Deflector 62 (see FIG. 3) is secured to an end of first protection member 52.

First protection member 52 is interposed between second protection member 38 and mid-rollers 20 as shown in FIG. 1. First protection member 52 is further positioned such that passageways 46 of second protection member 38 and plate holes 60 of first protection member 52 align as shown in FIG. 2. First protection member 52 and second protection member 38 are both positioned relative to mid-rollers 20 such that an axle 47 of each mid-roller 20 is positioned within a plate hole 60 of first protection member 52 and a passageway 46 of second protection member 38. Having axles 47 positioned in plate holes 60 and passageways 46 in the above described fashion is an important aspect of the present invention since it allows first shield assembly 36 to be located close to mid-rollers 20. Having first shield assembly 36 located close to mid-rollers 20 enhances the ability of first shield assembly 36 to protect track assembly 10. Having axles 47 positioned in plate holes 60 also allows first protection member 52 to move relative to second protection member 38 as discussed below.

Figure 4:
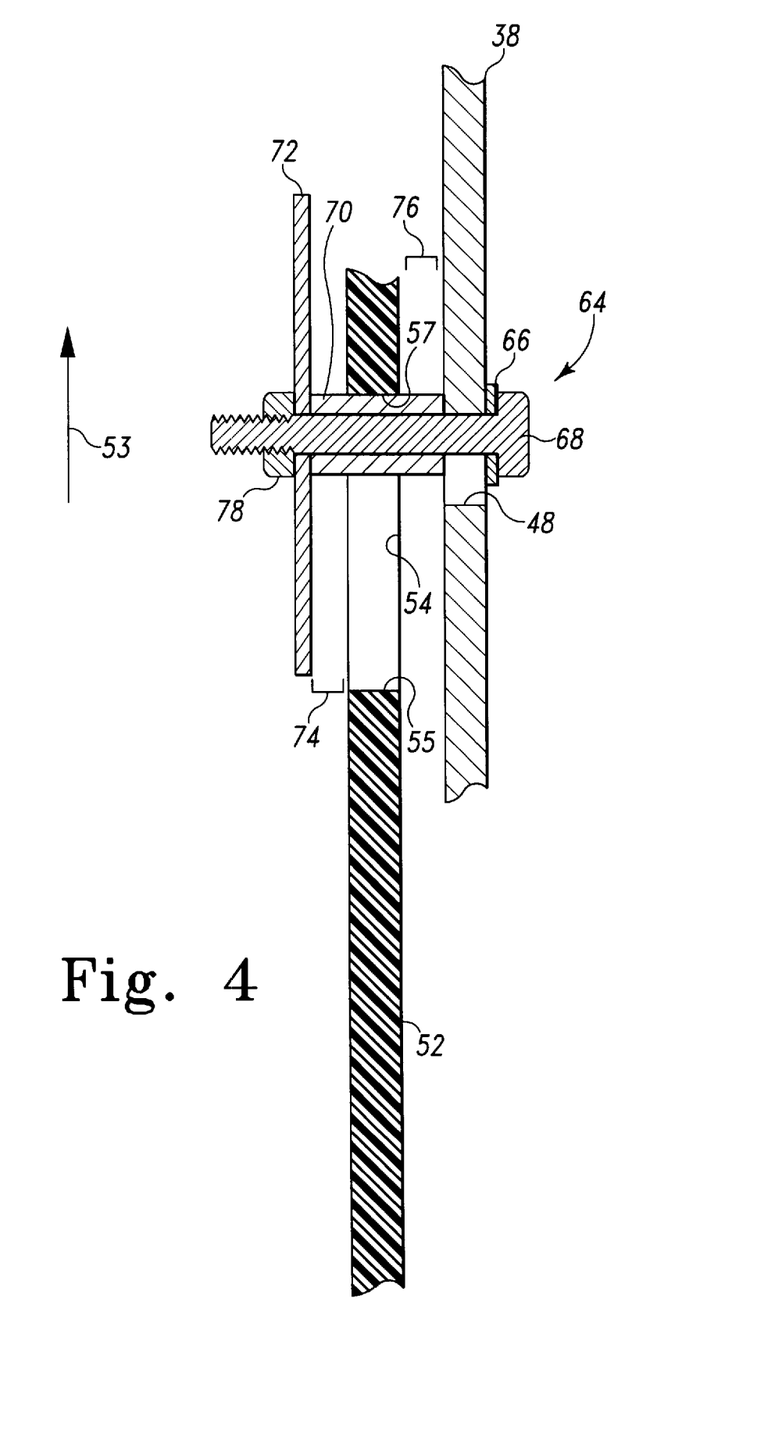
FIG. 4 is a fragmentary cross sectional view of a movement limiting mechanism taken along line 4—4 of FIG. 2 as viewed in the direction of the arrows.

First protection member 52 is movably secured to second protection member 38 via movement limiting mechanisms 64. As shown in FIG. 4, movement limiting mechanisms 64 include a washer 66, a bolt 68, a spacer 70, a washer 72 and a nut 78. Bolt 68 extends through a hole 48 defined in second protection member 38. Washer 66 is interposed between bolt 68 and second protection member 38. Bolt 68 also extends through slot 54 of first protection member 52. Spacer 70 is positioned around bolt 68 and extends through slot 54 of first protection member 52. One end of spacer 70 is in contact with second protection member 38. Nut 78 is secured to bolt 68, with washer 72 interposed between spacer 70 and nut 78. The end of spacer 70 opposite to the end in contact with second protection member 38 is in contact with washer 72. Thus spacer 70 is interposed between second protection member 38 and washer 72. Nut 78 is screwed onto bolt 68 until nut 78 contacts washer 72. The screwing of nut 78 onto bolt 68 secures bolt 68 to second protection member 38. It should be understood that spacer 70 has a length such that a first gap 74 is formed between first protection member 52 and washer 72 when bolt 68 is secured to second protection member 38. In addition, a second gap 76 is formed between first protection member 52 and second protection member 38 when bolt 68 is secured to second protection member 38. Note that the size of the gaps (i.e. first gap 74 and a second gap 76) shown in FIG. 4 are exaggerated for clarity of description.

First gap 74 and second gap 76 allow first protection member 52 to move relative to second protection member 38. Therefore, first protection member 52 is movable between a first position and a second position relative to second protection member 38. Note that first protection member 52 is shown in the first position in FIG. 4. First protection member 52 is located in the second position by its movement in a direction indicated by arrow 53. However, the distance first protection member 52 can move in the direction indicated by arrow 53 is limited to a point where an edge 55 of slot 54 contacts spacer 70. Similarly, the distance that first protection member 52 can move relative to second protection member 38 in a direction opposite to the one indicated by arrow 53 (i.e. back to the first position) is limited by the engagement of an edge 57 of slot 54 with spacer 70. However, it should be understood that first protection member 52 can move to any position located between edge 55 and edge 57.

Referring again to FIG. 5, first biasing assembly 80 includes a bracket 82, a biasing unit 84 and a force distribution member 94. Biasing unit 84 includes a pneumatic cylinder 88 connected to a rod 86. Pneumatic cylinder 88 is also connected to a movable shaft 90. An adapter 92 is attached to an end of movable shaft 90. An example of a pneumatic cylinder that can be used in the present invention is Stabilus part number 755613, available from Stabilus Co, located in Colmar, Pa.

Figure 5:
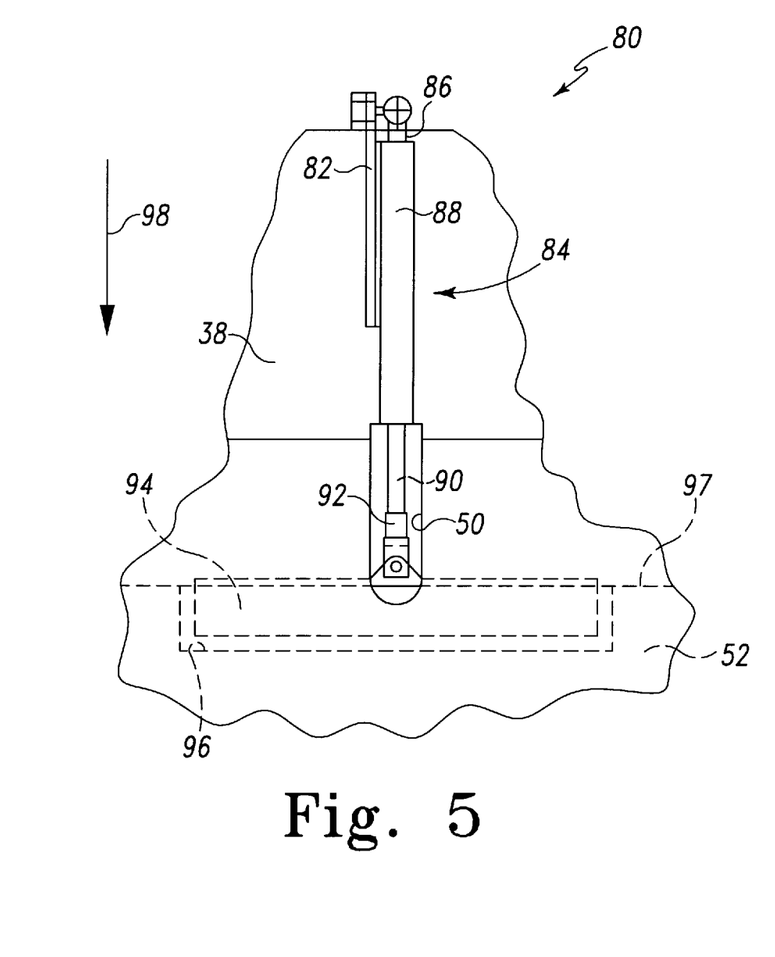
FIG. 5 is an enlarged fragmentary view of the first biasing assembly shown in FIG. 2 with the receptacle, the force distribution member and a portion of the first protection member shown in phantom.

Bracket 82 is mounted onto second protection member 38. Rod 86 is secured to bracket 82, thereby securing biasing unit 84 to second protection member 38. Movable shaft 90 extends through opening 50 defined in second protection member 38. Adapter 92 is attached to force distribution member 94. Force distribution member 94 is positioned within receptacle 96 of first protection member 52. It should be understood that a downward force, in the direction of arrow 98, is continuously applied to first protection member 52 by pneumatic cylinder 88, through movable shaft 90, adapter 92 and force distribution member 94. Force distribution member 94 facilitates the even distribution of the force applied to first protection member 52 by pneumatic cylinder 88. Since first protection member 52 is preferably made from a nonmetallic or plastic material, the even distribution of the force applied thereto helps to prolong the life of first protection member 52.

It should also be understood that first protection member 52 remains in the first position (see FIGS. 2 and 4) until a force greater than the downward force exerted by pneumatic cylinder 88 is applied to first protection member 52 in a direction opposite to the direction indicated by arrow 98. Such a force will hereinafter be called a second force. Once a second force is applied to first protection member 52, first protection member 52 moves in a direction opposite to the direction indicated by arrow 98. Movement of first protection member 52 in the direction opposite to the direction indicated by arrow 98 locates first protection member 52 in the second position (see FIG. 6). However, it should be appreciated that once the second force is removed from first protection member 52, first protection member 52 is moved back to the first position by first biasing assembly 80.

Referring back to FIG. 3, it should be understood that track assembly 10 has a second shield assembly 102 secured thereto. Second shield assembly 102 is secured to frame 12 such that frame 12 is interposed between first shield assembly 36 and second shield assembly 102. Second shield assembly 102 includes the same elements, and works in the same way, as first shield assembly 36. It should also be understood each tractor has two track assemblies 10, therefore each tractor can include two shield assemblies in addition to first shield assembly 36 and second shield assembly 102 (i.e. two shield assemblies per track assembly 10 for a total of four shield assemblies per tractor). The two additional shield assemblies are essentially identical to first shield assembly 36 and second shield assembly 102.

Figure 6:
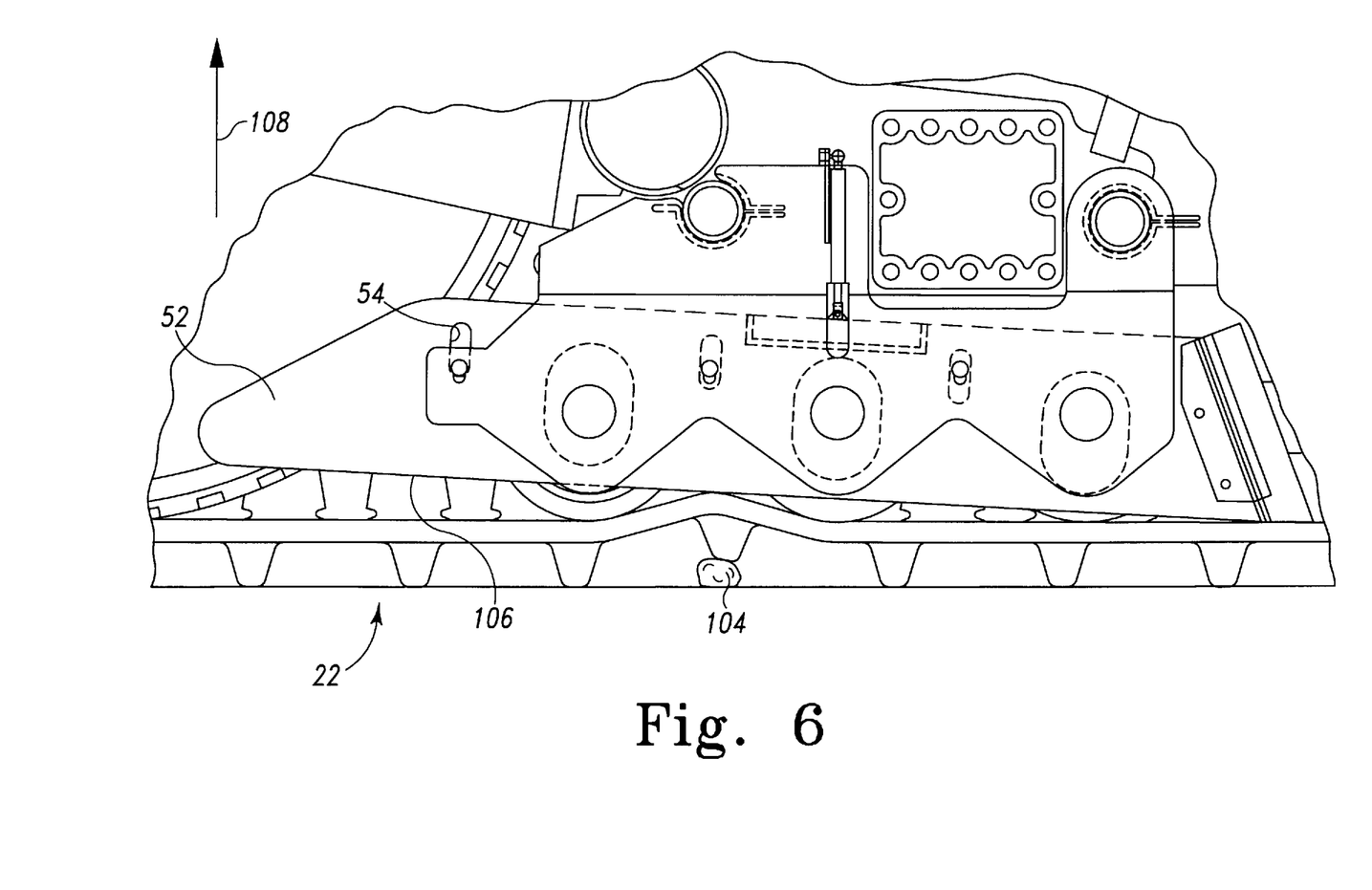
FIG. 6 is a view similar to that shown in FIG. 2, but showing the rubber track of the track assembly engaging an obstacle.

As shown in FIG. 6, when rubber track 22 comes into contact with an obstacle 104, such as a rock, a portion of rubber track 22 is moved in a direction indicated by arrow 108. The movement of rubber track 22 in the direction indicated by arrow 108 causes rubber track 22 to contact lower edge 106 of first protection member 52. The contact between rubber track 22 and first protection member 52 causes the second force to be applied to first protection member 52. As a result, first protection member 52 moves in the direction indicated by arrow 108 from the first position as shown in FIG. 2 to the second position as shown in FIG. 6. As a result, movable shaft 90 is caused to retract into the housing of pneumatic cylinder 88 (see FIG. 5). However, once the second force is no longer applied to first protection member 52 (i.e. when rubber track 22 is no longer in contact with obstacle 104), movable shaft 90 is forced to extend out from the housing of pneumatic cylinder 88 in the direction indicated by arrow 98 as shown in FIG.5. The above described extension of movable shaft 90 forces first protection member 52 to reassume its first position as shown in FIG. 2.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An apparatus for protecting a track assembly of a tractor, comprising:

a first protection member positioned adjacent to said track assembly, said first protection member being movable between a first position and a second position and; and a biasing assembly for biasing said first protection member into said first position, wherein said track assembly includes a track, and wherein said first protection member is spaced apart from said track when said protection member is located in said first position.

2. The apparatus of claim 1, further comprising a second protection member positioned adjacent to said track assembly, wherein:

said tractor includes a frame, and said second protection member is fixed in relation to said frame.

3. The apparatus of claim 2, wherein:

said first protection member is movable relative to said second protection member.

4. The apparatus of claim 3, further comprising:

means for limiting movement of said first protection member relative to said second protection member.

5. The apparatus of claim 1, wherein said first protection member assumes said second position upon application of an external force thereto.

6. An apparatus for protecting a track assembly of a tractor, comprising:

a first protection member positioned adjacent to said track assembly, said first protection member being movable between a first position and a second position;

a biasing assembly for biasing said first protection member into said first position;

a second protection member positioned adjacent to said track assembly, wherein (i) said tractor includes a frame, (ii) said second protection member is fixed in relation to said frame, and (iii) said first protection member is movable relative to said second protection member; and means for limiting movement of said first protection member relative to said second protection member, wherein (i) said movement limiting means includes a bolt, (ii) said first protection member has a slot defined therein, (iii) said second protection member has a hole defined therein, and (iv) said bolt extends through said slot of said first protection member and said hole of said second protection member.

7. The apparatus of claim 6, wherein:

said bolt is secured to said second protection member, said movement limiting means further includes (1) a spacer positioned around said bolt, (2) a nut secured to said bolt, and (3) a washer interposed between said spacer and said nut, and said spacer is interposed between said second protection member and said washer.

8. The apparatus of claim 7, wherein:

said spacer extends through said slot of said first protection member.

9. An apparatus for protecting a track assembly of a tractor, comprising:

a first protection member positioned adjacent to said track assembly, said first protection member being movable between a first position and a second position; and a biasing assembly for biasing said first protection member into said first position, wherein said biasing assembly includes a pneumatic cylinder.

10. The apparatus of claim 9, wherein:

said tractor includes a frame, and said pneumatic cylinder is secured to said frame.

11. The apparatus of claim 9, wherein:

said pneumatic cylinder includes a movable shaft, said first protection member has a receptacle defined therein, said movable shaft of said pneumatic cylinder includes a force distribution member secured thereto, and said force distribution member is positioned within said receptacle.

12. An apparatus for protecting a track assembly of a tractor, comprising:

a first shield assembly positioned adjacent to said track assembly, wherein (1) said first shield assembly includes a first protection member which is movable between a first position and a second position;

a first biasing assembly for biasing said first protection member into said first position;

a second shield assembly positioned adjacent to said track assembly, said second shield assembly includes a second protection member which is movable between a third position and a fourth position; and a second biasing assembly for biasing said second protection member into said fourth position.

13. The apparatus of claim 12, wherein:

said tractor includes a frame, said first shield assembly further includes a third protection member which is fixed in relation to said frame, and said second shield assembly further includes a fourth protection member which is fixed in relation to said frame.

14. The apparatus of claim 13, wherein:

said first biasing assembly includes a first pneumatic cylinder, and said second biasing assembly includes a second pneumatic cylinder.

15. The apparatus of claim 14, wherein:

said first pneumatic cylinder is secured to said frame, and said second pneumatic cylinder is secured to said frame.

16. A tractor, comprising:

a track assembly having a track;

a first protection member positioned adjacent to said track assembly, said first protection member being movable between a first position and a second position, wherein said first protection member is spaced apart from said track when said protection member is located in said first position; and a biasing assembly for biasing said first protection member into said first position.

17. A tractor, comprising:

a track assembly;

a first protection member positioned adjacent to said track assembly, said first protection member being movable between a first position and a second position; and a biasing assembly for biasing said first protection member into said first position, wherein said biasing assembly includes a pneumatic cylinder.

18. The apparatus of claim 17, further comprising a frame, wherein:

said pneumatic cylinder is secured to said frame.

* * * * *